(12) United States Patent  
Therrian

(10) Patent No.: US 8,256,304 B2  
(45) Date of Patent: Sep. 4, 2012

(54) FLOAT TYPE FLOW METER

(75) Inventor: Kevin P. Therrian, Hartford, WI (US)

(73) Assignee: Waukee Engineering Company, Inc., Milwaukee, WI (US)

( * ) Notice: Subject to any disclaimer, the term of this patent is extended or adjusted under 35 U.S.C. 154(b) by 336 days.

(21) Appl. No.: 12/799,735

(22) Filed: Apr. 30, 2010

(65) Prior Publication Data

US 2011/0265579 A1    Nov. 3, 2011

(51) Int. Cl.  
*G01F 1/22* (2006.01)

(52) U.S. Cl. .................................................. 73/861.57

(58) Field of Classification Search ........................ None  
See application file for complete search history.

(56) References Cited

U.S. PATENT DOCUMENTS

| | | | | | |
|---|---|---|---|---|---|
| 2,426,393 | A | * | 8/1947 | Fischer | 73/54.13 |
| 2,490,792 | A | * | 12/1949 | Fischer | 73/861.57 |
| 4,361,051 | A | * | 11/1982 | deFasselle et al. | 73/861.54 |
| 4,489,614 | A | * | 12/1984 | deFasselle et al. | 73/861.54 |
| 6,349,603 | B1 | * | 2/2002 | Spiess | 73/861.55 |

* cited by examiner

*Primary Examiner* — Harshad R Patel  
(74) *Attorney, Agent, or Firm* — Ryan Kromholz & Manion, S.C.

(57) ABSTRACT

A flow meter having a magnetic base sensor for electrical feedback of flow rate is disclosed. A float rod carrying an indicator and a magnet moves within the flow meter body with and the flow being visually read and electronically read.

5 Claims, 6 Drawing Sheets

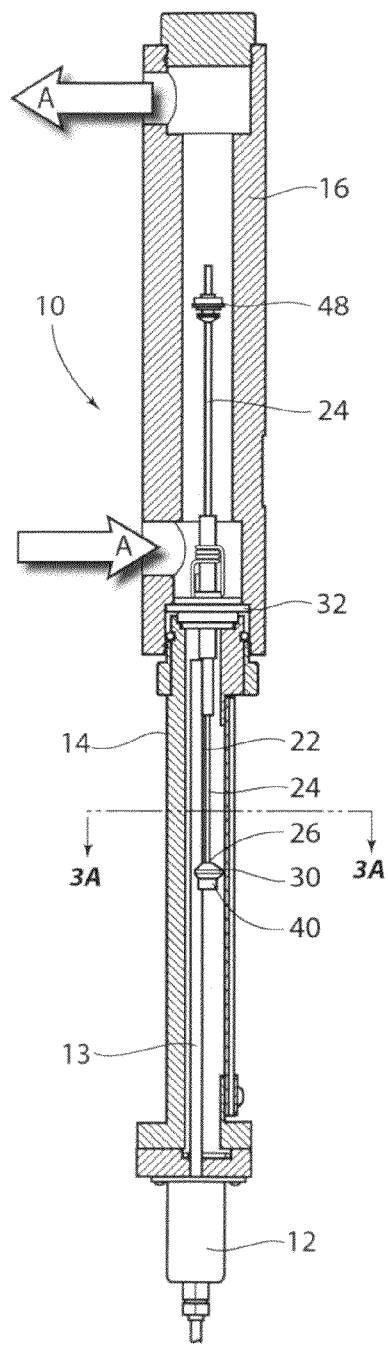
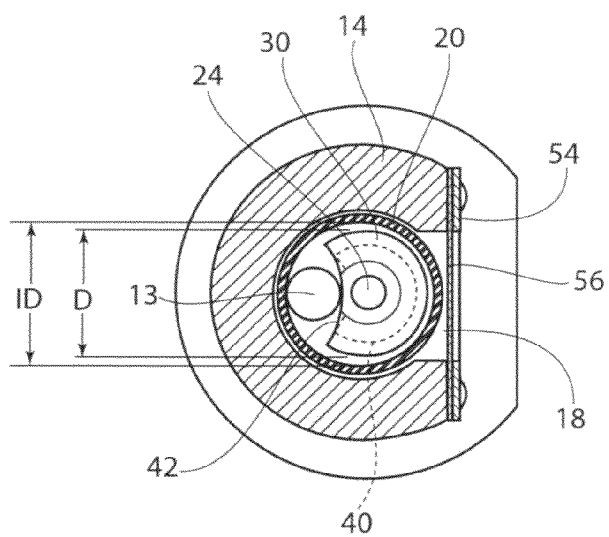
Fig. 3A
Fig. 3

FLOAT TYPE FLOW METER

BACKGROUND OF THE INVENTION

The present invention is directed to flow meters and in particular, float-type flow meters, used to measure the flow of air, industrial gasses or other fluids. In general, flow meters may be used to measure linear, nonlinear, mass or volumetric flow rate of a liquid or a gas. In float-type flow meters, a float is mounted for movement within a tapered passage in the body of the meter. The float will rise in proportion to the rate of fluid flow. Typically, the float carries a rod which extends downwardly into an elongated guard that houses a sight glass. An indicator mounted on the lower end of the rod moves within the sight glass in accordance with movement of the float and indicates the rate of fluid flow on a calibrated scale that is mounted on the guard adjacent the sight glass.

When an electronic feedback signal is required, a sensor may be used to determine the position of the indicator. Known devices typically utilize an optical design. An optical design may include a row of optical sensors on one side of the float rod and a row of light emitting diodes (LEDs) on the opposite side. The position of the float rod determines which optical sensors receive light. The optical sensors sense the presence or lack of light and provide an electrical signal in proportion to the flow rate.

A typical sight glass tube contains a fluid to not only aid in dampening but also to provide a media for the light from the LEDs. When the flow meter is used with dirty gasses, the dampening fluid is susceptible to contamination which degrades sensor performance to the point of inoperability. Sensor integrity is maintained by replacing the contaminated dampening fluid with fresh fluid. This process is time consuming and requires the equipment that the flow meter is servicing be down for maintenance. This downtime can result in loss of production which may further have a negative impact on the end user. Consequently, improved methods and devices for sensing indicator position are needed.

SUMMARY OF THE INVENTION

The flow meter disclosed herein ameliorates the noted problems by utilizing a magnetic base sensor for electrical feedback of flow rate. Magnetic base sensors are not affected by contaminates in the dampening fluid. A magnetic base sensor used in the present invention may be any of a variety of magnet sensors available. An embodiment of the present invention may include an elongated guard which extends downwardly from the body of the flow meter and includes a slot or recess that houses a sight glass. An indicator with a magnet carried by the float rod moves within the sight glass and the flow is visually read as well as electronically read.

The present invention may include several design configurations, including a sensing rod in line with the float rod, in which a ring magnet is used. Alternatively, the float rod may be adjacent the magnetic sensor. Further, the output of the magnet sensor can be any variety of digital or analog signals that is in relation to the position of the flow meter indicator.

BRIEF DESCRIPTION OF THE DRAWINGS

FIG. 3 is a cross section of the device shown in FIG. 1A, taken along lines 3-3 thereof and showing flow direction.

FIG. 3A is a cross section of the device shown in FIG. 3, taken along lines 3A-3A thereof and showing relative diameters of the cooperating parts.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 4A:
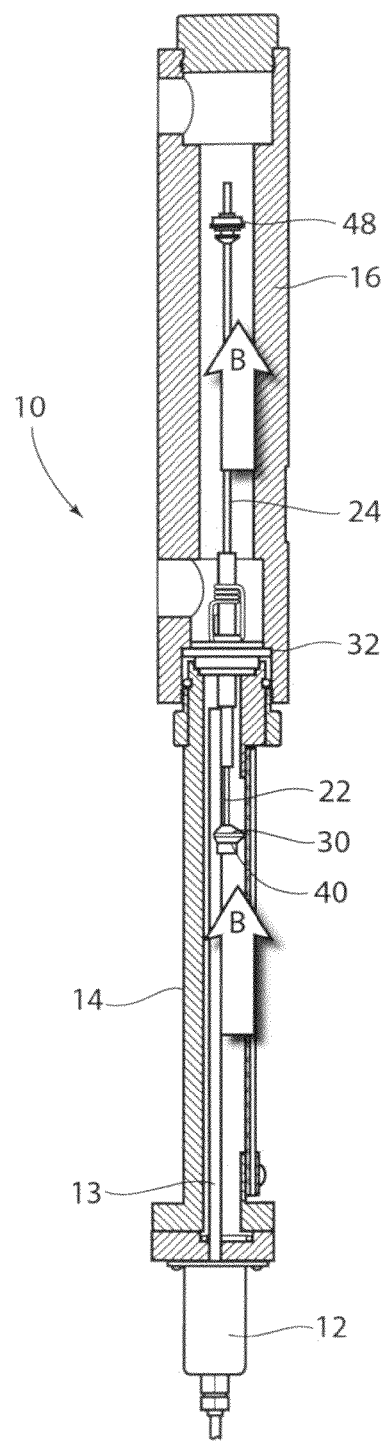
FIG. 4A is a cross section of the device shown in FIG. 1A, similar to that of FIG. 3, but showing movement of the rod assembly.
Figure 4B:
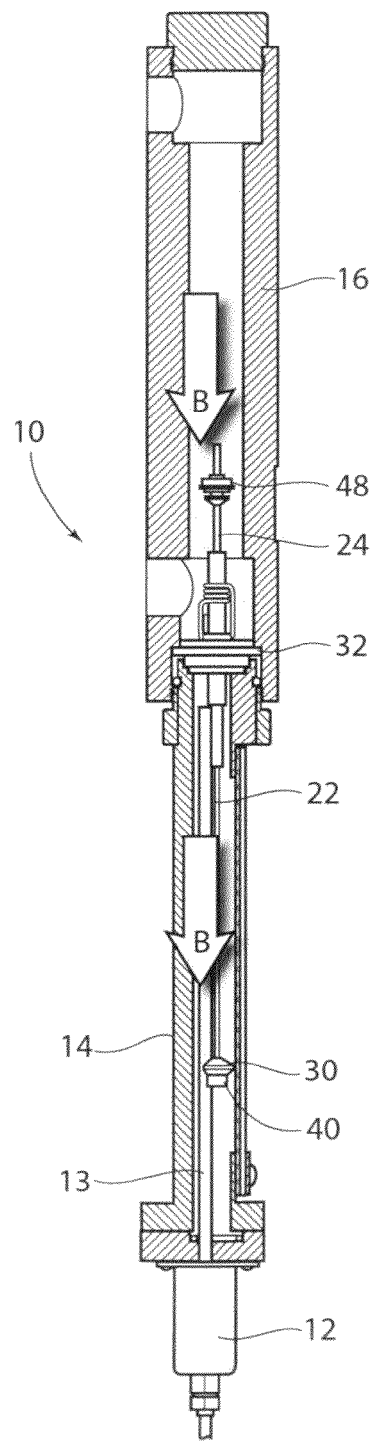
FIG. 4B is a cross section of the device shown in FIG. 1A, similar to that of FIG. 3, but showing movement of the rod assembly.

As may be seen in the Figures, the present invention is directed to a flow meter 10 having a magnetic base flow sensor 12 having a magnetic sensing rod 13 for electrical feedback of flow rate. As illustrated, an embodiment of the present flow meter 10 may include an elongated tubular guard 14 which extends downwardly from the body 16 of the flow meter 10 and includes a slot or recess 18 that houses a sight glass 20 (see FIG. 2). The sight glass 20 is preferably formed as a hollow tube seated lengthwise within the recess 18 and surrounded by a series of vertically spaced scaled indices. As seen particularly in FIGS. 3-4B, a float rod assembly 22 moves axially endwise of the tubular sight glass 20 in response to fluid flow. As further illustrated, fluid entering and exiting the flow meter 10 in the direction of arrows A (see FIGS. 3-4B, inclusive) will cause the float rod assembly 22 to move in the direction of arrows B. It is to be understood that the output of the magnet sensor 12 can be any variety of digital or analog signals that is in relation to the position of the flow meter indicator.

Figure 5:
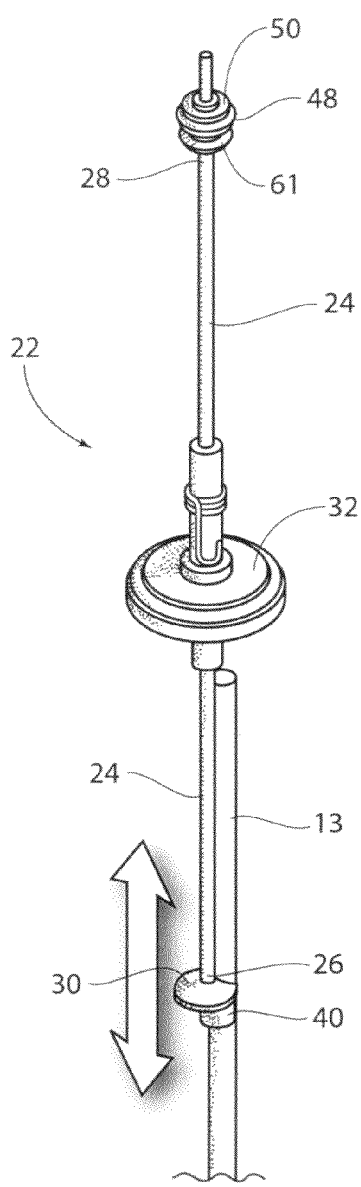
FIG. 5 is a fragmentary detail view of a rod assembly.
Figure 6:
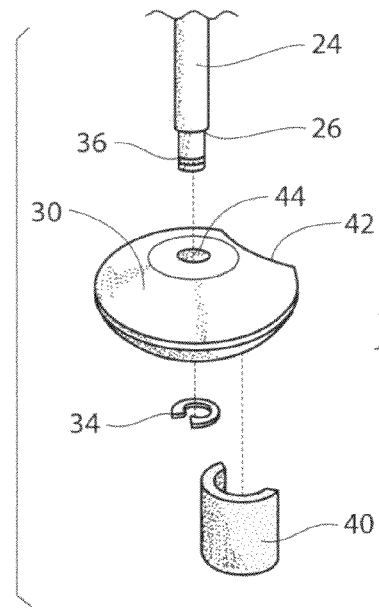
FIG. 6 is a fragmentary detail view of an indicator and magnet assembly.
Figure 7:
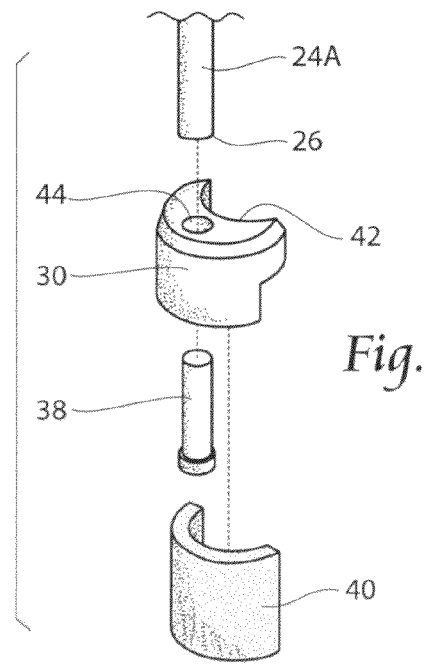
FIG. 7 is a fragmentary detail view of an indicator and magnet assembly.

With reference to FIG. 5, a preferred float rod assembly 22 may be seen. As may be viewed from FIGS. 3-4B, the float rod assembly 22 may include a float rod 24 having a first end 26 and a second end 28. An indicator 30 with a reflective surface is located on the first operating end 26 of the float rod 24, with a float stop body 32 located intermediate the first and second ends 26, 28. A magnet 40 is further attached to the indicator 30 so that the magnet 40 and indicator 30 move in unison in response to fluid flow. To assure proper function, the indicator 30 and float rod 24 may be coupled in a manner able to permit the indicator 30 and float rod 24 to spin freely and independently relative to one another. As shown in FIG. 6, the indicator 30 may be attached to the float rod 24 by way of a retaining ring 34 and groove 36, with the aperture 44 in indicator 30 having a diameter slightly larger than that of the float rod 24 to allow rotation thereabout. Alternatively, and as illustrated in FIG. 7, the indicator 30 may be attached to the float rod 24 by way of a float rod tube 24A and retaining plug 38 assembly. It is to be noted that any method of coupling the indicator 30 to the float rod 24 that permits the indicator 30 and the float rod 24 to rotate independently from one another may be acceptable.

Figure 8:
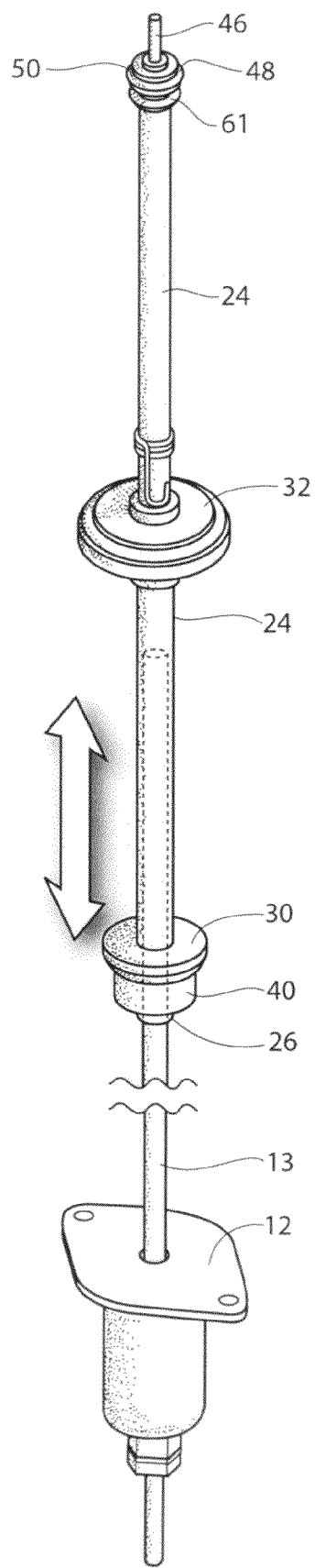
FIG. 8 is a fragmentary detail view of a rod assembly and showing a sensing rod in line with a float rod.

With reference now to FIG. 5, it may be further seen that a float rod assembly 22, according to the present invention, may include a float rod 24 axially extending through a float stop body 32 (see also FIG. 8). A float 48, calibration weight 50, and a zero adjustment indicator 61 are carried on the second end 28 of the float rod 24. It is to be noted that the weight of the float rod assembly 22 is of importance in the present flow meter 10 design. For example, the weight of the float rod assembly 22 must be light enough to allow calibration of the flow meter 10. If the float rod assembly 22 is too heavy, it will be hindered from desired function with flow meters calibrated to relatively small flow rates. To maintain a relatively low operation weight, the float rod 24 is preferably made of a light weight, easily cut, pierced, or otherwise bent or formed to a desired operating function material, such as aluminum rod, thin wall stainless steel or aluminum tubing, rigid plastic rod or tubing, or any other acceptable material.

Figure 1A:
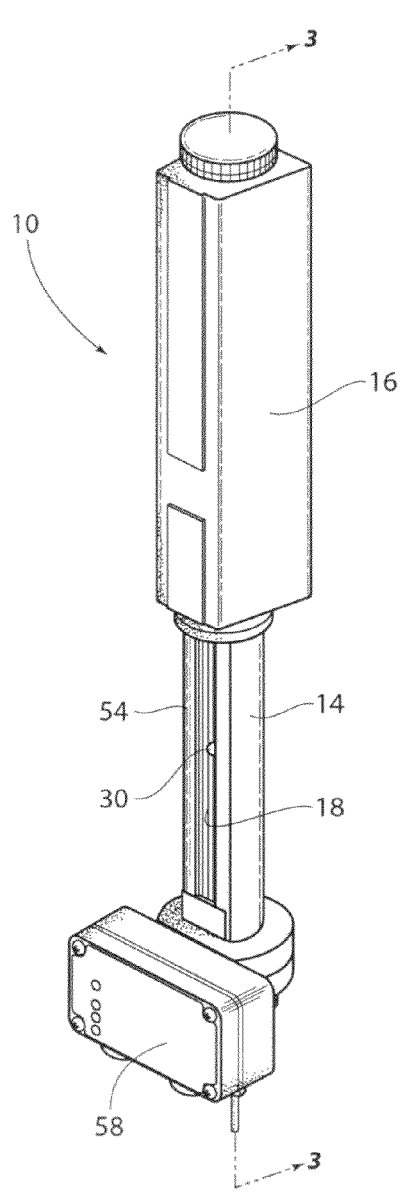
FIG. 1A is a perspective view of a flow sensor and flow meter according to the present invention in use with an electric converter box.
Figure 1B:
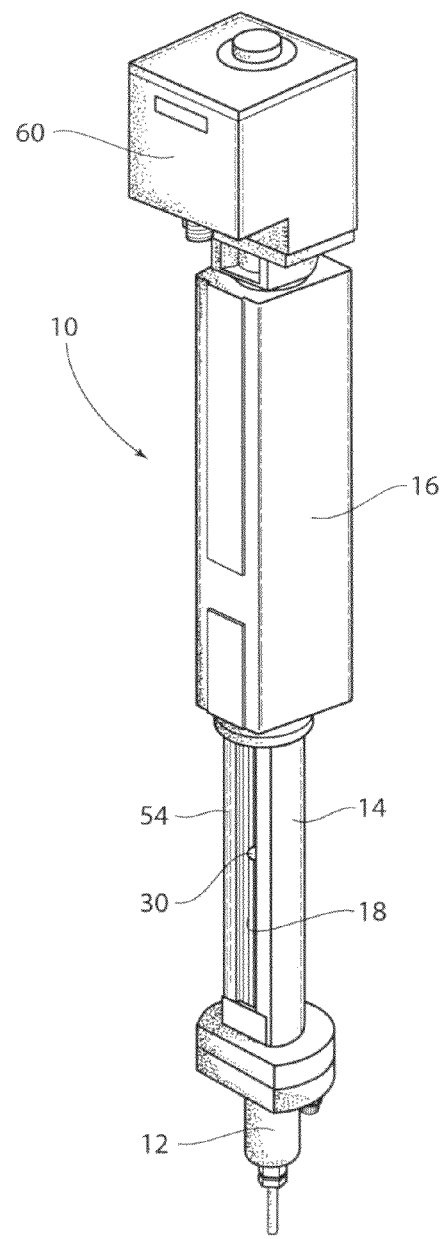
FIG. 1B is a perspective view of a flow sensor and flow meter according to the present invention in use with an electronic control valve.
Figure 2:
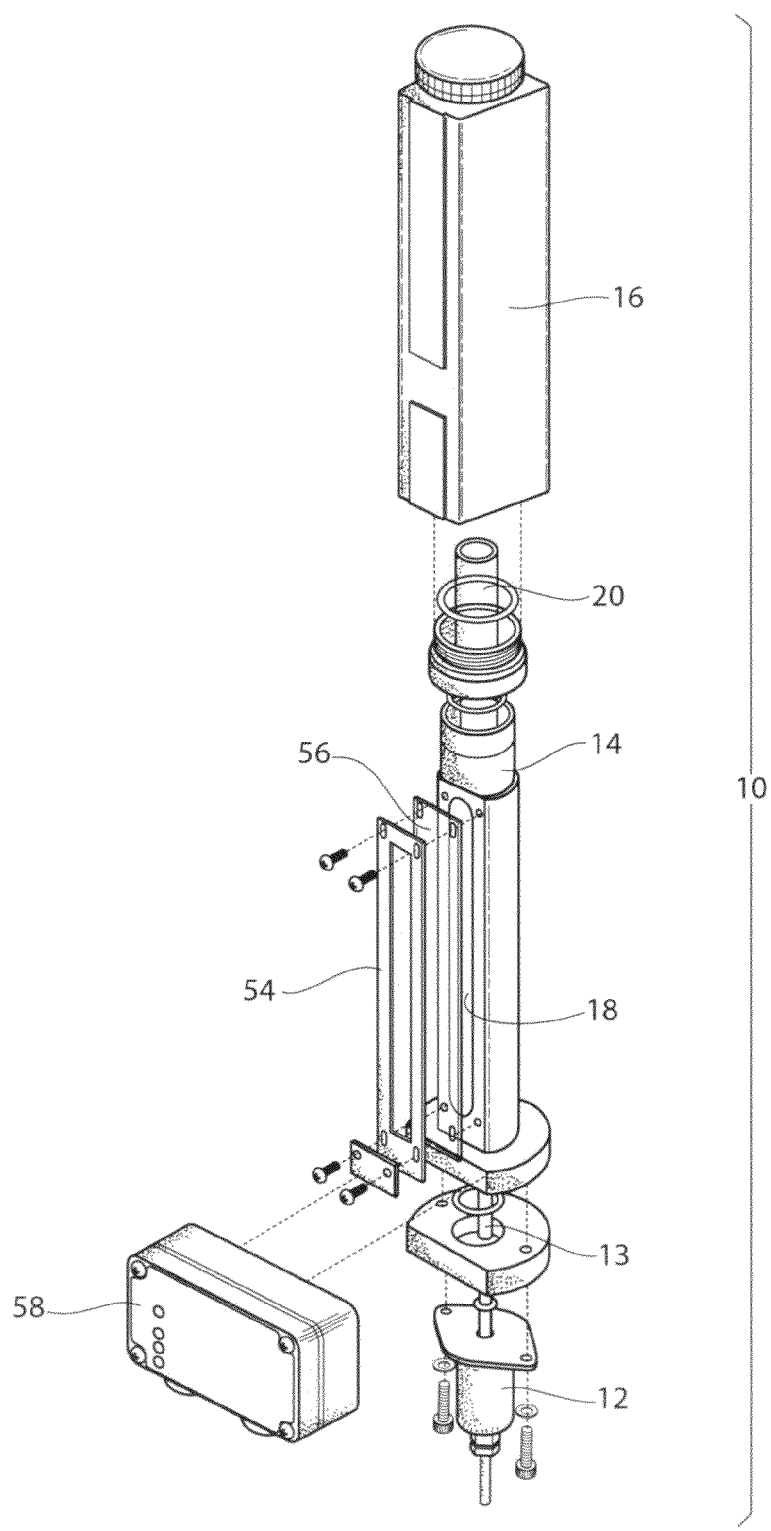
FIG. 2 is an exploded view of the device illustrated in FIG. 1A.

As viewed in FIGS. 1A-2, in operation, flow is visually read on a scale plate 54 which may be mounted, sketched or painted on the outer surface of the safety shield 56 bordering the slot 18. As mentioned, the flow may be further read electronically by a linear magnetic sensor 12 and magnetic sensing rod 13 that may be mounted either adjacent to the float rod assembly 22, as seen in FIGS. 5-7, inclusively or axially aligned with the float rod assembly 22 as illustrated in FIG. 8.

As may be further viewed in FIGS. 5-7, an embodiment of the present invention provides a magnetic base flow sensor 12 having a magnetic sensing rod 13 for electrical feedback of flow rate. As illustrated particularly in FIG. 5, the sensor. rod 13 may be located adjacent to the float rod assembly 22. In this configuration, the magnet 40 faces the sensor rod 13. As shown, the indicator 30 preferably includes a cut out portion 42. Cut out portion 42 is adapted to interface with the sensor rod 13 to thereby minimize rotation of the indicator 30 and thereby ensure that the magnet 40 properly faces the sensor rod 13. The magnets 40 utilized in this design may be button magnets, half ring magnets, or any other magnet having a suitable shape and size.

With reference now to FIG. 3A, relative diameters of the cooperating components 30, 20 may be seen. The relationship between the diameter D of the indicator 30 and the inner diameter ID of the sight glass tube 20 is of importance to thereby keep the distance between the sensing rod 13 and magnet 40 at a minimum. Specifically, the indicator 30 diameter D is preferably slightly smaller than the inner diameter ID of the sight glass tube 20. This relationship allows free movement of the indicator 30 and ensures that the distance between the magnet 40 and sensing rod 13 is kept at a minimum. If the distance is too great between the magnet 40 and sensing rod 13, the sensor 12 will not reliably sense the position of the magnet 40 and thus the indicator 30 position.

As seen in FIG. 8, a flow meter 10 of the present invention may be configured with the sensing rod 13 coaxially aligned with the float rod 24. In this configuration (see FIG. 8) the float rod 24 has a tubular form of sufficient size to both fit over the sensor rod 13 and to allow free movement of the float rod 24 without interference from the sensor rod 13. This design preferably utilizes a ring magnet 40 that is attached to the second end 26 of the float rod 24. As may be viewed, and similarly to the previously mentioned embodiment, the float rod assembly 22 may include a float rod 24 having a first end 26 and a second end 28. An indicator 30 is located on the first end 26 of the float rod 24, with a float stop body 32 located intermediate the first and second ends 26, 28. A magnet 40 is further attached to the indicator 30 so that the magnet 40 and indicator 30 move in unison in response to fluid flow. Further a float 48, calibration weight 50, and the zero adjustment indicator 61 are carried on the second end 28 of the float rod 24. A float rod stud 46 extends from the second end 28.

It is to be noted that a flow meter 10 according to the present invention may be used in conjunction with an electrical converter box 58 when a stand alone installation is required (see FIG. 1A). Alternatively, the present flow meter 10 may be used with an electronic control valve 60 (see FIG. 1B). This arrangement permits electronics in the control valve 60 to interpret signal received from the flow sensor 12.

A method according to the present invention may include the steps of: providing a flow meter 10 having a magnetic base flow sensor 12, the magnetic base flow sensor 12 having a magnetic sensing rod 13 for electrical feedback of flow rate; providing the flow meter with an elongated guard 14 which extends downwardly from the body 16 of the flow meter 10 and includes a slot or recess 18 that houses a sight glass 20; providing a float rod assembly having at least one magnet attached thereto; introducing a fluid into the flow meter body 16;

and moving the float rod assembly 22 within the sight glass 20 in response to fluid flow.

It should also be noted that the above inventions could be used with various types of fluids, including gases and liquids.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A float type flow meter, said flow meter including a housing, a tubular guard extending downwardly from the housing, a tubular sight glass contained within the confines of said guard;

a float rod assembly axially movable within said tubular sight glass responsive to fluid flow;

said float rod assembly including:

a float rod having a first end and a second end;

an indicator located on the first end; and a float stop body located intermediate of said first end and said second end;

a magnet attached to said indicator and being cooperatively coupled with one another to move in unison with one another responsive to fluid flow;

a magnetic base flow sensor having a magnetic sensing rod for electrical feedback of fluid flow rate; and means for visually viewing relative fluid flow rate and comprising a scale plate positioned adjacent said tubular sight glass and for relative location with said indicator.

2. The flow meter set forth in claim 1 including an electrical convertor box responsive to said fluid flow rate.

3. The flow meter of claim 1 and further including an electrical convertor box for "stand alone" installation.

4. The flow meter of claim 1, wherein the diameter of said indicator is smaller than the inner diameter of said sight glass.

5. The flow meter of claim 4, wherein the distance between the diameter of said indicator and the inner diameter of said sight glass allows free movement of the indicator.

* * * * *